(12) United States Patent
Moriyama

(10) Patent No.: US 9,890,796 B2
(45) Date of Patent: Feb. 13, 2018

(54) VACUUM PUMP DEVICE AND VACUUM PUMP DEVICE SYSTEM

(71) Applicant: Shimadzu Corporation, Kyoto (JP)

(72) Inventor: Nobuhiko Moriyama, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 87 days.

(21) Appl. No.: 15/040,380

(22) Filed: Feb. 10, 2016

(65) Prior Publication Data
US 2017/0227018 A1 Aug. 10, 2017

(51) Int. Cl.
H02P 3/14 (2006.01)
F04D 29/58 (2006.01)
F04D 25/06 (2006.01)
F04D 27/00 (2006.01)

(52) U.S. Cl.
CPC ........... *F04D 29/584* (2013.01); *F04D 25/06* (2013.01); *F04D 27/001* (2013.01); *F04D 27/004* (2013.01)

(58) Field of Classification Search
CPC .... H02N 2/14; H05K 7/20272; H01M 10/613
See application file for complete search history.

(56) References Cited

U.S. PATENT DOCUMENTS

| 8,480,379 B2 | 7/2013 | Moriyama et al. | |
| 2010/0247350 A1* | 9/2010 | Nagano | F04B 35/045 417/410.1 |
| 2010/0303644 A1 | 12/2010 | Moriyama | |
| 2013/0098595 A1* | 4/2013 | Schall | B60H 1/0005 165/202 |
| 2014/0071623 A1* | 3/2014 | Suzuki | H05K 7/20636 361/699 |

FOREIGN PATENT DOCUMENTS

| JP | 59-99227 | 7/1984 |
| JP | 2009-174333 | 8/2009 |
| JP | 2010-236468 | 10/2010 |
| JP | 2012-24728 | 2/2012 |
| JP | 5104334 B2 | 12/2012 |
| JP | 2013-119798 | 6/2013 |

OTHER PUBLICATIONS

Office Action for corresponding Japanese App. No. 2013-247624, dated Jul. 4, 2017 (English translation).

* cited by examiner

*Primary Examiner* — Karen Masih
(74) *Attorney, Agent, or Firm* — Renner Otto Boisselle & Sklar, LLP

(57) ABSTRACT

A vacuum pump device comprises: a power supply device including a dew condensation detector configured to detect dew condensation, a regenerative braking resistance, and a controller configured to energize the regenerative braking resistance; a cooling system using coolant; and a pump main body including a motor rotatably driven by the power supply device. When the dew condensation detector detects the dew condensation, the controller energizes the regenerative braking resistance to heat an inside of the power supply device.

9 Claims, 10 Drawing Sheets

VACUUM PUMP DEVICE AND VACUUM PUMP DEVICE SYSTEM

BACKGROUND OF THE INVENTION

1. Technical Field

The present invention relates to a vacuum pump device and a vacuum pump device system.

2. Background Art

In the present specification, a device including a power supply device and a vacuum pump main body is referred to as a "vacuum pump device." Moreover, a device including a vacuum pump main body serving as a turbo-molecular pump is referred to as a "turbo-molecular pump device."

The turbo-molecular pump device rotatably drives, using a motor, a rotor provided with rotor blades, and the rotor blades rotate relative to stationary blades at high speed to exhaust gas molecules. This turbo-molecular pump device is used connected to various types of vacuum processing devices.

Since the power supply device of the turbo-molecular pump device includes, as a heat generation source, a converter and an inverter, cooling is required. In the case of a turbo-molecular pump device used under clean environment, a water-cooling method for cooling with coolant water is preferred.

Typically, a water-cooling type power supply device has a semi-hermetic structure. For this reason, a dew-point temperature in the power supply device is equal to an external temperature. Since the pump main body of the turbo-molecular pump device is maintained at high temperature, a temperature around the power supply device is relatively warm. In the case of water cooling, the power supply device itself is cooled by a cooling jacket, and therefore, the power supply device is maintained at relatively-low temperature. Accordingly, the temperature of the power supply device is lower than an ambient dew-point temperature. This tends to occur dew condensation. If dew condensation occurs in the power supply device, malfunction of the power supply device might occur due to, e.g., short circuit of a circuit.

Patent Literature 1 (Japanese Patent No. 5104334) discloses a vacuum pump configured such that when dew condensation in a power supply device is detected, a coolant water valve is closed to stop a coolant water flow after operation of the vacuum pump is stopped, and as a result, the dew condensation is eliminated.

However, in the vacuum pump described in Patent Literature 1, operation of the vacuum pump needs to be stopped in order to stop the coolant water flow.

SUMMARY OF THE INVENTION

A vacuum pump device comprises: a power supply device including a dew condensation detector configured to detect dew condensation, a regenerative braking resistance, and a controller configured to energize the regenerative braking resistance; a cooling system using coolant; and a pump main body including a motor rotatably driven by the power supply device. When the dew condensation detector detects the dew condensation, the controller energizes the regenerative braking resistance to heat an inside of the power supply device.

The vacuum pump device further comprises: a coolant switcher configured to switch between a state in which a flow of the coolant for cooling the power supply device is blocked and a state in which the flow of the coolant for cooling the power supply device is allowed. When the dew condensation detector detects the dew condensation, the controller causes the coolant switcher to block the coolant.

The power supply device further includes a timer configured to measure a time for which the dew condensation remains, and When the dew condensation is detected, the controller energizes the regenerative braking resistance, and then, when the dew condensation remains for a predetermined time, the controller causes the coolant switcher to block the coolant.

The power supply device further includes a temperature detector configured to monitor an inner temperature of the power supply device, the temperature detector monitors the inner temperature of the power supply device when the controller energizes the regenerative braking resistance, and when the inner temperature of the power supply device is equal to or higher than a predetermined upper temperature limit, the controller stops energization of the regenerative braking resistance.

When a difference between the predetermined upper temperature limit and the inner temperature of the power supply device is equal to or greater than a predetermined value, the controller sets a current applied to the regenerative braking resistance at a greater value, and when the difference is less than the predetermined value, the controller sets the current applied to the regenerative braking resistance at a smaller value.

The controller energizes the regenerative braking resistance by PWM control, when the difference between the predetermined upper temperature limit and the inner temperature of the power supply device is equal to or greater than the predetermined value, the controller sets a PWM duty ratio at a grater value to set the current applied to the regenerative braking resistance at a greater value, and when the difference is less than the predetermined value, the controller sets the PWM duty ratio at a smaller value to set the current applied to the regenerative braking resistance at a smaller value.

The power supply device further includes a current detector configured to detect a current applied to the motor, and when the current is equal to or greater than a predetermined current value, the controller does not energize the regenerative braking resistance.

The power supply device further includes a current detector configured to detect a current applied to the motor, when the current is equal to or greater than a predetermined current value, the controller sets a current applied to the regenerative braking resistance at a smaller value, and when the current is less than the predetermined current value, the controller sets the current applied to the regenerative braking resistance at a greater value.

The controller energizes the regenerative braking resistance by PWM control, when the current is equal to or greater than the predetermined current value, the controller sets a PWM duty ratio at a smaller value to set the current applied to the regenerative braking resistance at a smaller value, and when the current is less than the predetermined current value, the controller sets the PWM duty ratio at a greater value to set the current applied to the regenerative braking resistance at a greater value.

A vacuum pump device system comprises: a plurality of vacuum pump devices; and a cooling system configured to cause coolant to flow in series in the vacuum pump devices. Each vacuum pump device includes a power supply device having a dew condensation detector configured to detect dew condensation, a heat generator, and a controller configured to energize the heat generator when the dew condensation detector detects the dew condensation, and a pump main body.

According to the present invention, the regenerative braking resistance typically used only for deceleration of rotor rotation can be used as a heater for eliminating dew condensation to eliminate dew condensation in the power supply device of the vacuum pump device. Moreover, in the present invention, dew condensation in the power supply device of the vacuum pump device can be eliminated without stopping operation of the vacuum pump device.

DETAILED DESCRIPTION OF PREFERRED EMBODIMENTS

As described above, in the present specification, a device including a power supply device and a vacuum pump main body is referred to as a "vacuum pump device." A turbo-molecular pump device will be described as an example of the vacuum pump device of the present invention. Note that the present invention is also applicable to a vacuum pump device including a pump main body serving as a molecular drag pump.

First Embodiment

Figure 1:
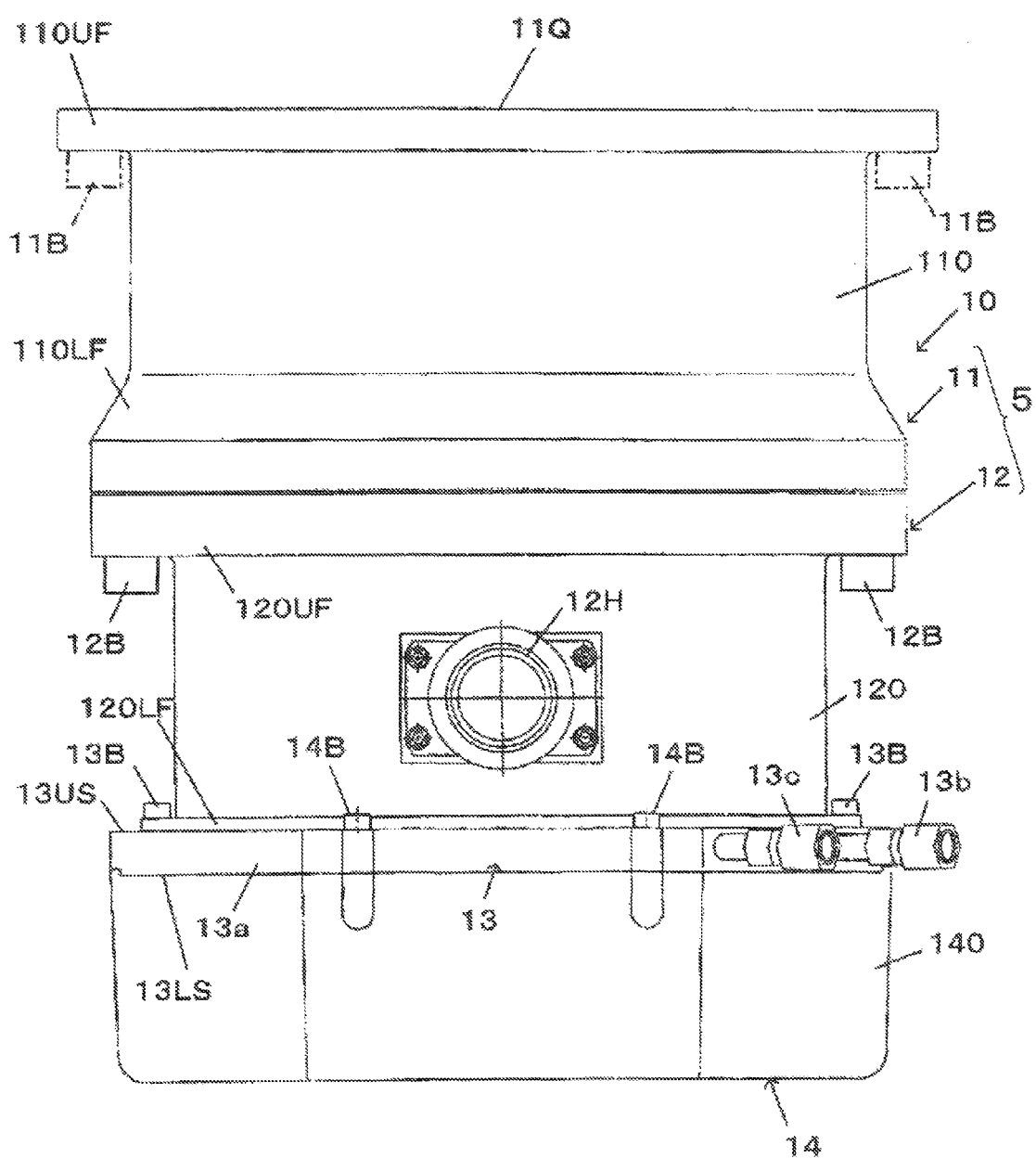
FIG. 1 is a view of an exterior appearance of a turbo-molecular pump device 10.

FIG. 1 is a view of an exterior appearance of a turbo-molecular pump device 10 of the present embodiment. The turbo-molecular pump device 10 includes a pump main body 5, a cooling device 13, and a power supply device 14 configured to drive and control the pump main body 5. The pump main body 5 includes an upper pump portion 11 having a turbo pump portion, and a lower pump portion 12 having a drag pump portion.

Since the pump main body 5 has a well-known structure, description thereof will not be described in detail. The pump main body 5 mainly includes a rotating body having a rotor 20 (see FIG. 2) provided with rotor blades and a rotor cylindrical section, a rotor shaft, and a rotor disc; fixed blades cooperating with the rotor blades; a screw stator cooperating with the rotor cylindrical section; a motor 16 (see FIG. 2) configured to rotatably drive the rotating body.

Figure 2:
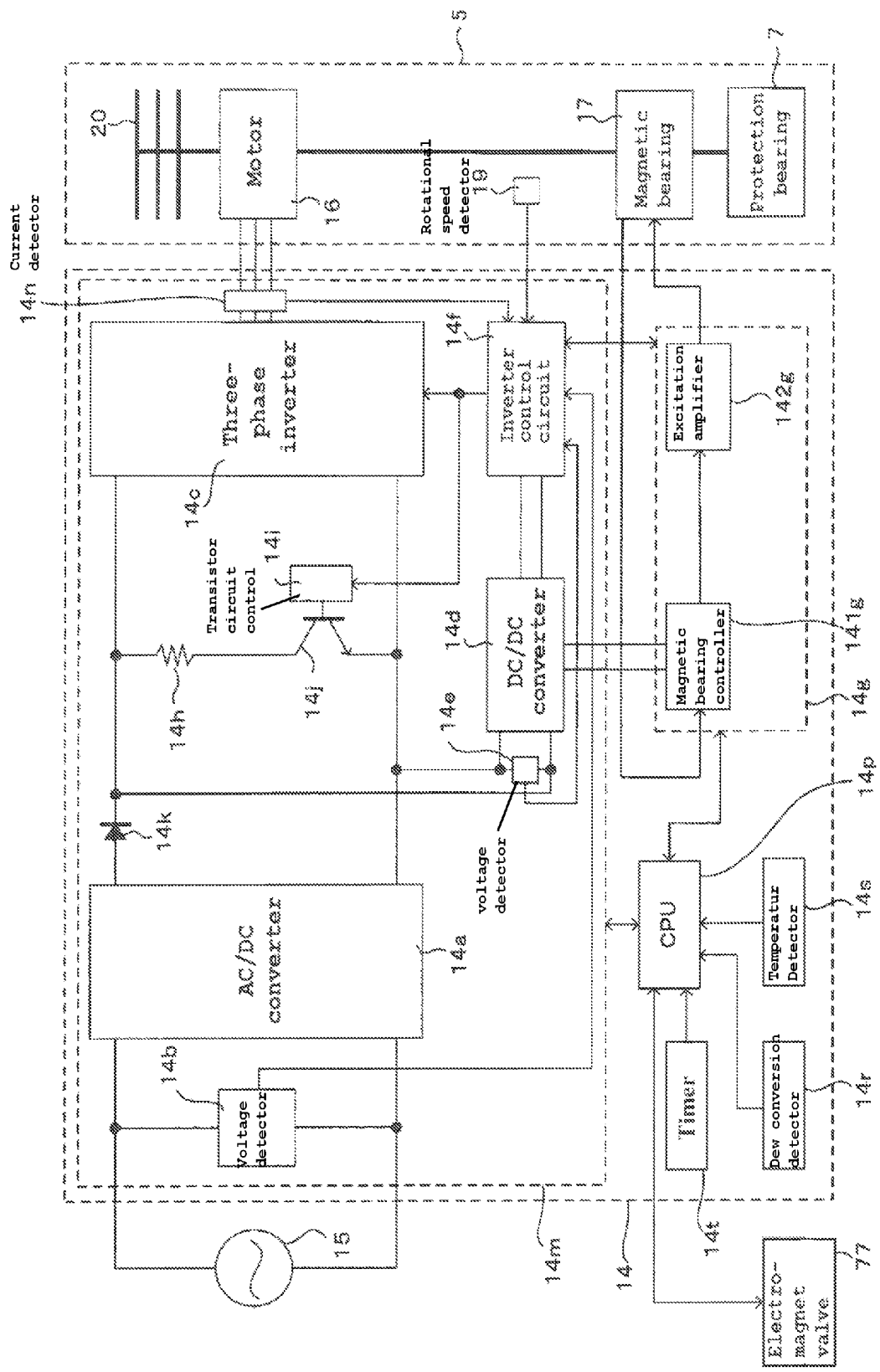
FIG. 2 is a block diagram of details of a power supply device 14.

The rotating body is non-contactably supported by an electromagnet forming a five-axis magnetic bearing 17 (see FIG. 2). The rotating body rotatably magnetically-levitated by the magnetic bearing is rotatably driven at high speed by the motor 16. Then, the rotor blades rotate relative to the fixed blades at high speed, and the rotor cylindrical section rotates relative to the screw stator at high speed. Accordingly, gas molecules are sucked from a vacuum processing device (not shown) connected to a suction port 11Q, and are exhausted from an exhaust port 12H connected to a back port.

Figure 3A:
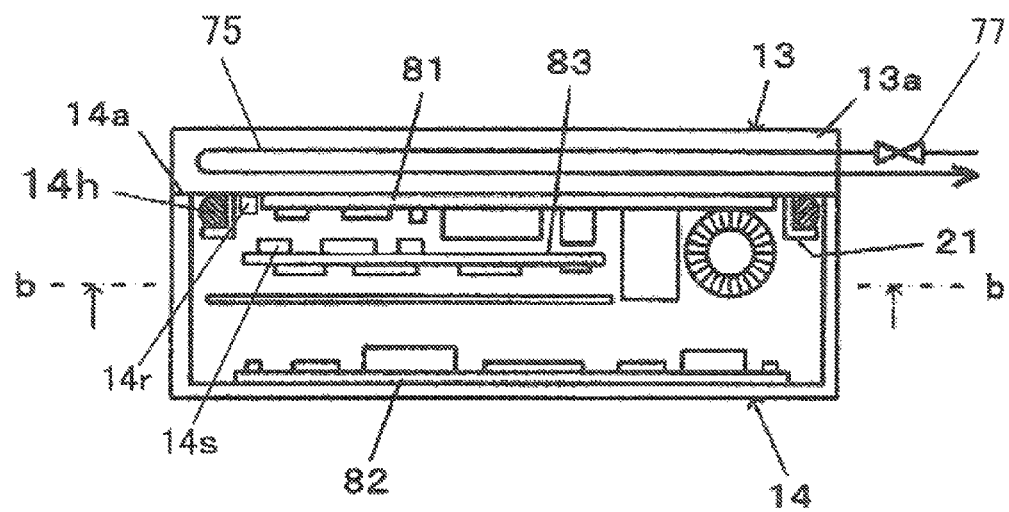
FIG. 3A is a longitudinal sectional view of the inside of a power supply device housing 140.
Figure 3B:
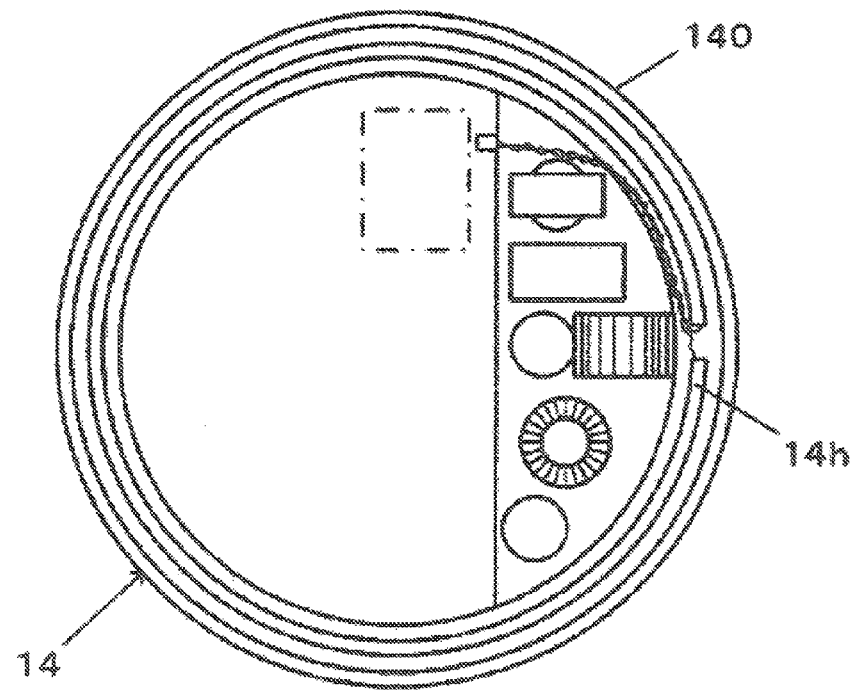
FIG. 3B is a cross-sectional view of the device along a b-b line.

The cooling device 13 is interposed between the pump main body 5 and the power supply device 14, and is configured to mainly cool a heat generation member, particularly an electronic component of a motor drive circuit, in the power supply device 14. As illustrated in FIGS. 3A and 3B, the cooling device 13 includes a cooling jacket main body 13a in which a coolant water path 75 (see FIG. 3) is formed, and a coolant water inlet 13b and a coolant water outlet 13c for circulating coolant water from a not-shown pump in the coolant water path 75.

The upper pump portion 11 includes a case 110, and the case 110 is provided with connection flanges 110UF, 110LF on the upper and lower sides as viewed in FIG. 1. The lower pump portion 12 includes a case 120, and the case 120 is provided with connection flanges 120UF, 120LF on the upper and lower sides as viewed in FIG. 1. The cases 110, 120 are collectively referred to as a "pump case." The upper connection flange 110UF of the upper pump portion 11 is connected to an exhaust port of the not-shown vacuum processing device with bolts 11B. The lower connection flange 110LF of the upper pump portion 11 is connected to the upper connection flange 120UF of the lower pump portion 12 with bolts 12B. The lower connection flange 120LF of the lower pump portion 12 is placed on an upper surface 13US of the cooling device 13, and the cooling device 13 is fastened onto a lower surface 13LS of the lower pump portion 12 with bolts 13B. The lower surface of the cooling device 13 contacts an upper end surface of a housing (made of metal) 140 of the power supply device 14, and the power supply device housing 140 is fastened onto the cooling device 13 with bolts 14B.

The power supply device 14 will be described with reference to FIG. 2. The power supply device 14 includes a first controller 14m, a second controller 14g, a CPU 14p, a timer 14t, a temperature detector 14s, and a dew condensation detector 14r.

The CPU 14p is configured to communicate with the first controller 14m, the second controller 14g, the timer 14t, the temperature detector 14s, and the dew condensation detector 14r to control the first controller 14m and the second controller 14g.

The first controller 14m is provided mainly for conversion and distribution of power, motor driving, and control of a regenerative braking resistance. AC power is supplied from a primary power source 15 to the first controller 14m, and then, is input to an AC/DC converter 14a. The voltage of the input AC power is detected by a voltage detector 14b. The AC/DC converter 14a is configured to convert the AC power supplied from the primary power source 15 into DC power. The DC power output from the AC/DC converter 14a is input to a three-phase inverter 14c configured to drive the motor 16, a DC/DC converter 14d, and a regenerative braking resistance 14h. The voltage of the DC power input to the DC/DC converter 14d is detected by a voltage detector 14e. The output of the DC/DC converter 14d is input to an inverter control circuit 14f configured to control the three-phase inverter 14c by, e.g., PWM control, and the second controller 14g configured to control magnetic levitation of the rotating body by the magnetic bearing 17. Although wiring is not shown in the figure, such output is also input to the CPU 14p, the timer 14t, the temperature detector 14s, and the dew condensation detector 14r.

The value of current flowing through the motor 16 and detected by a current detector 14n and the rotation speed of the rotor 20 detected by a rotation speed detector 19 are input to the inverter control circuit 14f, and the inverter control circuit 14f is configured to control the three-phase inverter 14c based on the value of current flowing through the motor 16 and the rotation speed of the rotor 20.

The regenerative braking resistance 14h is provided for consuming regenerative power in deceleration of the rotor 20, and is formed of a sheath heater. In the present embodiment, not only the power of the rotor 20 (the motor 16) is input to the regenerative braking resistance 14h, but also power is input from the AC/DC converter 14a to the regenerative braking resistance 14h. The power input from the AC/DC converter 14a to the regenerative braking resistance 14h means that the regenerative braking resistance 14h is energized using power from the primary power source 15 which is one form of a power supply source for the power supply device 14. Power is input from the AC/DC converter 14a to the regenerative braking resistance 14h because of the following reasons: the regenerative braking resistance 14h is actively utilized as a heat generator (a heater) to heat the inside of the power supply device 14 by the regenerative braking resistance 14h, and as a result, dew condensation in the power supply device 14 is eliminated. The same applies to the following embodiments and variations. Note that elimination of dew condensation in the power supply device 14 by the regenerative braking resistance 14h actively utilized as the heat generator will be described in detail below.

A transistor control circuit 14i is controlled by a command of the inverter control circuit 14f. Control of ON/OFF of a transistor 14j by the transistor control circuit 14i controls ON/OFF of current flowing through the regenerative braking resistance 14h. Moreover, PWM control can be performed for the transistor control circuit 14i, and a PWM duty ratio can be changed to control an increase/decrease in current flowing through the regenerative braking resistance 14h. A diode 14k is provided for preventing power from flowing back in regeneration of the rotor 20.

The second controller 14g includes a magnetic bearing controller 141g configured to perform bearing control, and an excitation amplifier 142g configured to supply excitation current to the magnetic bearing 17 based on a control signal calculated by the magnetic bearing controller 141g. The second controller 14g is configured to control magnetic levitation of the rotating body by the magnetic bearing 17. Note that for the case where the rotating body is not magnetically levitated, the pump main body 5 includes a protection bearing 7.

The dew condensation detector 14r is configured to detect whether or not dew condensation occurs in the power supply device 14 to transmit such information to the CPU 14p.

The timer 14t is configured to measure a time for which the dew condensation detector 14r continuously detects dew condensation to transmit such information to the CPU 14p.

The temperature detector 14s is configured to detect the inner temperature of the power supply device 14 to transmit such information to the CPU 14p.

Information on the value of current flowing through the motor 16 and detected by the current detector 14n is transmitted to the CPU 14p via the inverter control circuit 14f of the first controller 14m.

The CPU 14p communicates with the first controller 14m, the second controller 14g, the timer 14t, the temperature detector 14s, and the dew condensation detector 14r. Then, the CPU 14p controls, based on information obtained by such communication, the above-described functions of the first controller 14m and the second controller 14g.

The function of eliminating dew condensation in the power supply device 14 will be mainly and specifically described. The CPU 14p performs, based on information from the dew condensation detector 14r, the temperature detector 14s, and the current detector 14n, ON/OFF control and PWM control for the transistor control circuit 14i to control current applied to the regenerative braking resistance 14h. Moreover, the CPU 14p grasps, by communication, the opening/closing state of a two-way electromagnetic valve 77 serving as a coolant switcher provided at the coolant water path 75 (see FIG. 3). Then, based on information from the timer 14t, the CPU 14p controls opening/closing of the electromagnetic valve 77 to block or allow a coolant water flow. Note that the function of eliminating dew condensation in the power supply device 14 will be described in detail with reference to FIGS. 5 to 10.

FIGS. 3A and 3B are views of specific arrangement of elements and substrates of the power supply device 14. FIG. 3A is a longitudinal sectional view of the cooling jacket main body 13a and the power supply device 14, and FIG. 3B is a cross-sectional view along a b-b line of FIG. 3A. The first controller illustrated in FIG. 2 is a high-power portion configured to supply power to the motor, and includes the regenerative braking resistance 14h serving as a heat generation element in regeneration. Thus, such a first controller is disposed in contact with a lower surface of the cooling jacket main body 13a of the cooling device 13. Although not particularly limited, various electronic components are separately arranged on a plurality of substrates 81 to 83.

The coolant water path 75 is provided in the cooling jacket main body 13a. The two-way electromagnetic valve 77 serving as the coolant switcher is provided at the coolant water path 75, and opening/closing of the electromagnetic valve 77 is controlled by the CPU 14p.

An inner region of the power supply device 14 where dew condensation tends to occur is a region contacting the cooling jacket main body 13a and not including the substrate 81 and the regenerative braking resistance 14h. As illustrated in FIG. 3A, the dew condensation detector 14r is provided at such a region.

The temperature detector 14s is provided for preventing excessive heating of the power supply device 14 due to heating of the regenerative braking resistance 14h. Thus, as illustrated in FIG. 3A, the temperature detector 14s is preferably provided on the substrate 83 considered as exhibiting a high temperature in the power supply device 14.

Flowcharts of control in the first embodiment will be described with reference to FIGS. 4 and 5. These flowcharts are performed by the CPU 14p provided in the power supply device 14 illustrated in FIG. 2.

Figure 4:
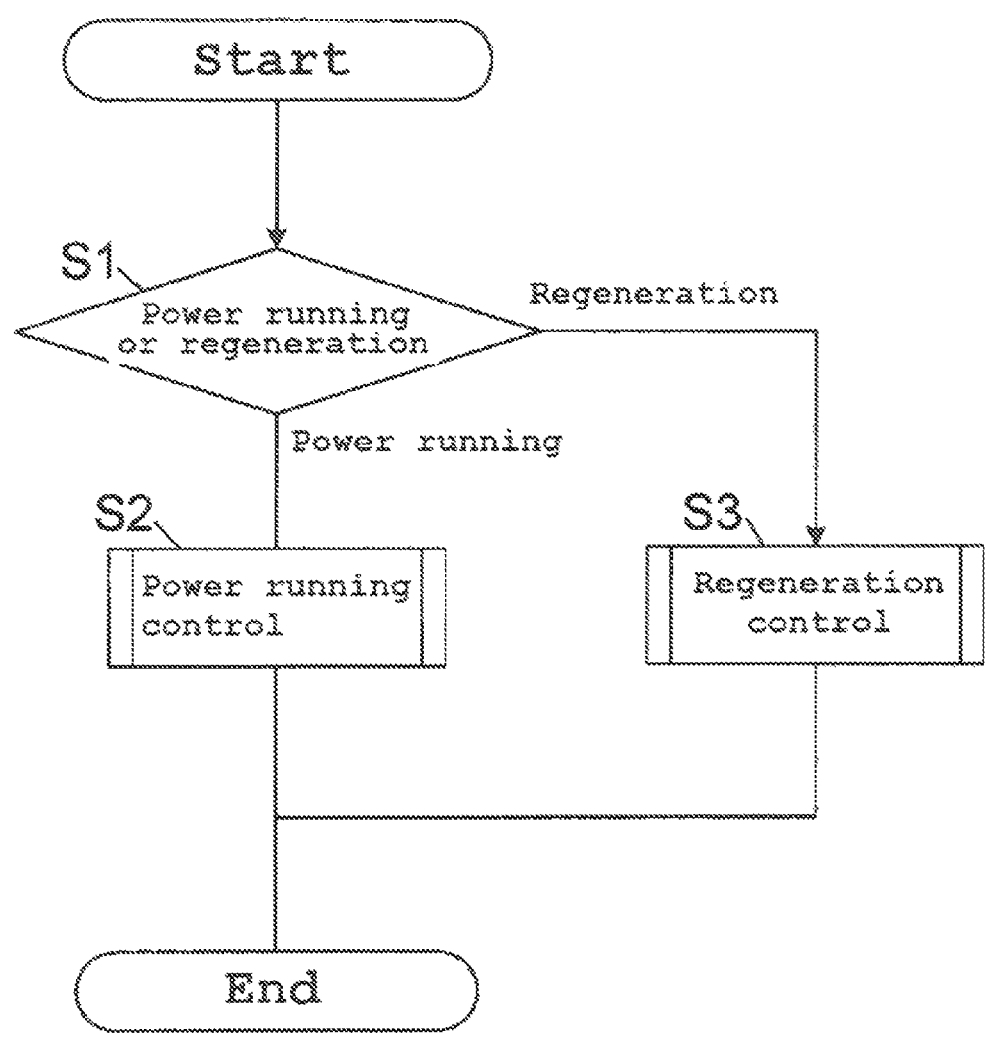
FIG. 4 is a flowchart of control made in the turbo-molecular pump device 10.

FIG. 4 is the flowchart of the outline of control of the turbo-molecular pump device 10. In operation of the turbo-molecular pump device 10, the flowchart of FIG. 4 is repeated.

When the process begins, the process proceeds to step S1 to determine whether power running control for rotating the rotor 20 (the motor 16) or regeneration control for decelerating and stopping the rotor 20 (the motor 16) is performed. In the regeneration control, the regenerative braking resistance 14h is energized using regenerative power from the motor 16. On the other hand, in the power running control, the regenerative braking resistance 14h is not energized using regenerative power from the motor 16. In the case of performing the power running control, the process proceeds to step S2 to perform the power running control, and then, the process is completed. In the case of performing the regeneration control, the process proceeds to step S3 to perform the regeneration control, and then, the process is completed. As described above, in operation of the turbo-molecular pump device 10, the flowchart of FIG. 4 is repeated.

Dew condensation elimination control described later is performed as part of the power running control of step S2 (see FIG. 5). Note that for the regeneration control, typical control for decelerating the rotor 20 (the motor 16) is performed using the regenerative braking resistance 14h.

Figure 5:
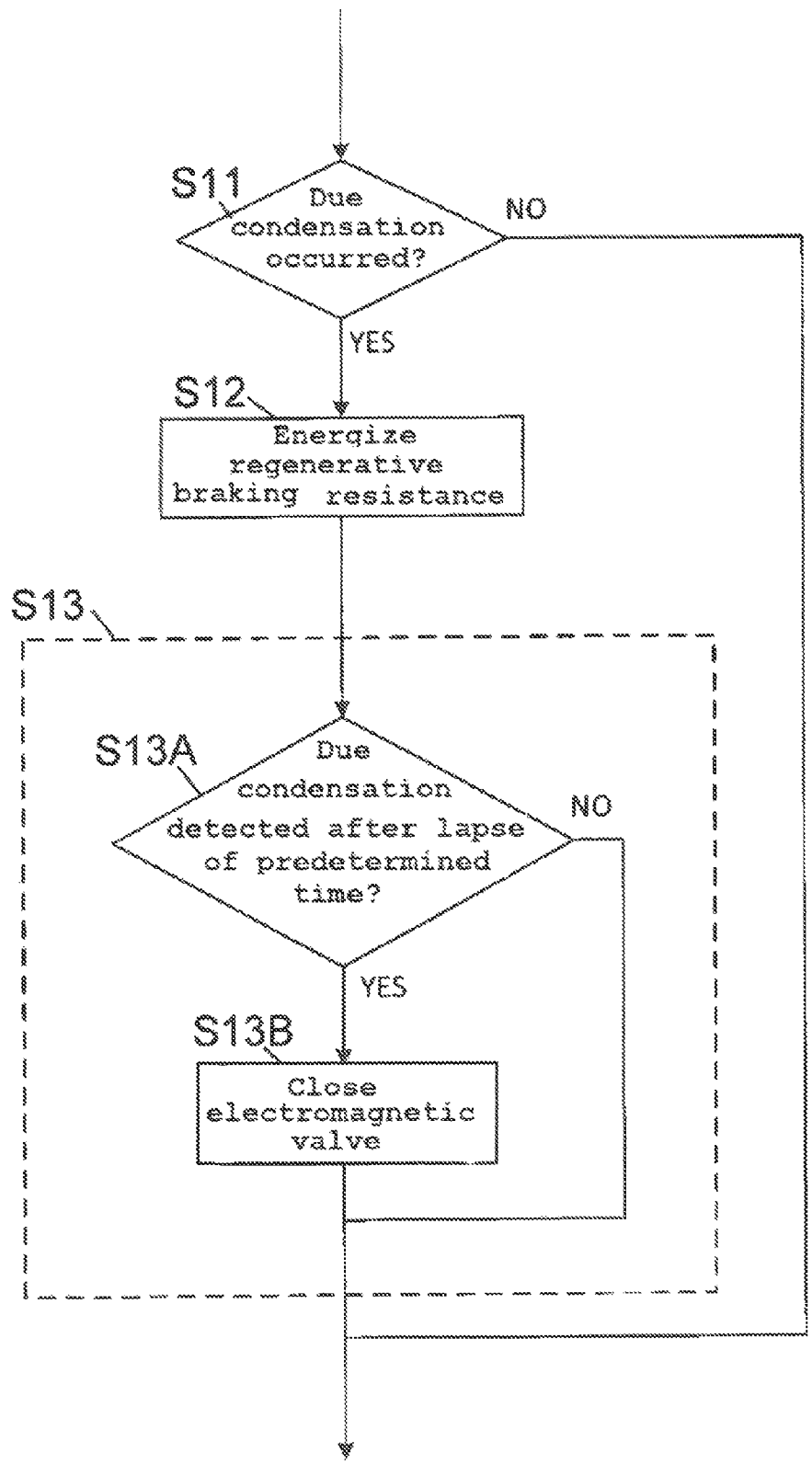
FIG. 5 is a flowchart of dew condensation elimination control in a first embodiment.

FIG. 5 is the flowchart of the dew condensation elimination control in the present embodiment. As described above, the dew condensation elimination control is performed as part of the power running control of step S2 of FIG. 4.

At step S11, when the dew condensation detector 14r detects dew condensation, it is determined as "yes," and the process proceeds to step S12. When dew condensation is detected, the timer 14t begins measurement. When no dew condensation is detected, it is determined as "no," and the process shown in FIG. 5 is completed.

At step S12, the transistor control circuit 14i of the first controller 14m having received a command from the CPU 14p turns on the transistor 14j. Accordingly, the regenerative braking resistance 14h is energized. Subsequently, the process proceeds to step S13. Note that the CPU 14p functions to distribute the output of the first controller 14m such that no change occurs in energization of the motor 16 and the magnetic bearing 17 due to the above-described energization.

In the present embodiment, step S13 is performed. In the case of performing step S13, when dew condensation is detected at step S11, the timer 14t begins measurement as described above. Then, after a lapse of a predetermined time set in advance, the process proceeds to step S13A. At step S13A, when the dew condensation detector 14r still detects dew condensation even after a lapse of the predetermined time, it is determined as "yes," and the process proceeds to step S13B. Then, the CPU 14p closes the electromagnetic valve 77 to block a coolant water flow in the coolant water path 75, and then, the process shown in FIG. 5 is completed. When no dew condensation is detected by the dew condensation detector 14r, it is determined as "no," and the process shown in FIG. 5 is completed. Note that when determination of step S13A of FIG. 5 is completed, measurement by the timer 14t is terminated, and a measured time is reset.

In the first embodiment, when a coolant water flow in the coolant water path 75 is blocked, not only cooling of the power supply device 14 but also cooling of the pump main body 5 are stopped. For this reason, at step S13, control for closing the electromagnetic valve 77 is performed when dew condensation remains even after a lapse of the predetermined time. Thus, dew condensation can be eliminated only by heating by the regenerative braking resistance 14h with blocking of a coolant water flow in the coolant water path 75 being suppressed as much as possible, and prevention of cooling of the pump main body 5 can be suppressed to a minimum.

The following features and advantageous effects are exhibited according to the first embodiment described above.

(1) When the dew condensation detector 14r detects dew condensation in the power supply device 14, the transistor control circuit 14i of the first controller 14m having received the command from the CPU 14p turns on the transistor 14j, and the regenerative braking resistance 14h is energized using DC current from the AC/DC converter 14a.

Thus, the regenerative braking resistance 14h generates heat to heat the inside of the power supply device 14, and therefore, dew condensation in the power supply device 14 can be eliminated.

(2) The timer 14t measures the time for which the dew condensation detector 14r continuously detects dew condensation to transmit such information to the CPU 14p. After a lapse of the predetermined time, i.e., the time for which dew condensation remains, the CPU 14p closes the electromagnetic valve 77.

Thus, when dew condensation is not still eliminated even by heating by the regenerative braking resistance 14h, a coolant water flow in the coolant water path 75 is blocked such that cooling of the power supply device 14 is suppressed, and as a result, dew condensation can be eliminated. Since dew condensation can be eliminated only by heating by the regenerative braking resistance 14h with blocking of a coolant water flow in the coolant water path 75 being suppressed as much as possible, an advantageous effect that prevention of cooling of the pump main body 5 can be suppressed to a minimum is exhibited.

In the first embodiment, the following variations may be implemented.

First Variation of First Embodiment

In FIG. 5, the predetermined time at step S13A may be zero. That is, right after the regenerative braking resistance 14h is energized (step S12), the electromagnetic valve 77 can be closed (step S13B). This can more quickly eliminate dew condensation as compared to the first embodiment.

Second Variation of First Embodiment

In FIG. 5, control is made to perform step S13, but control may be made to skip step S13. This can reduce a burden on the CPU 14p. Note that in this case, the timer 14t does not operate.

Third Variation of First Embodiment

Figure 6:
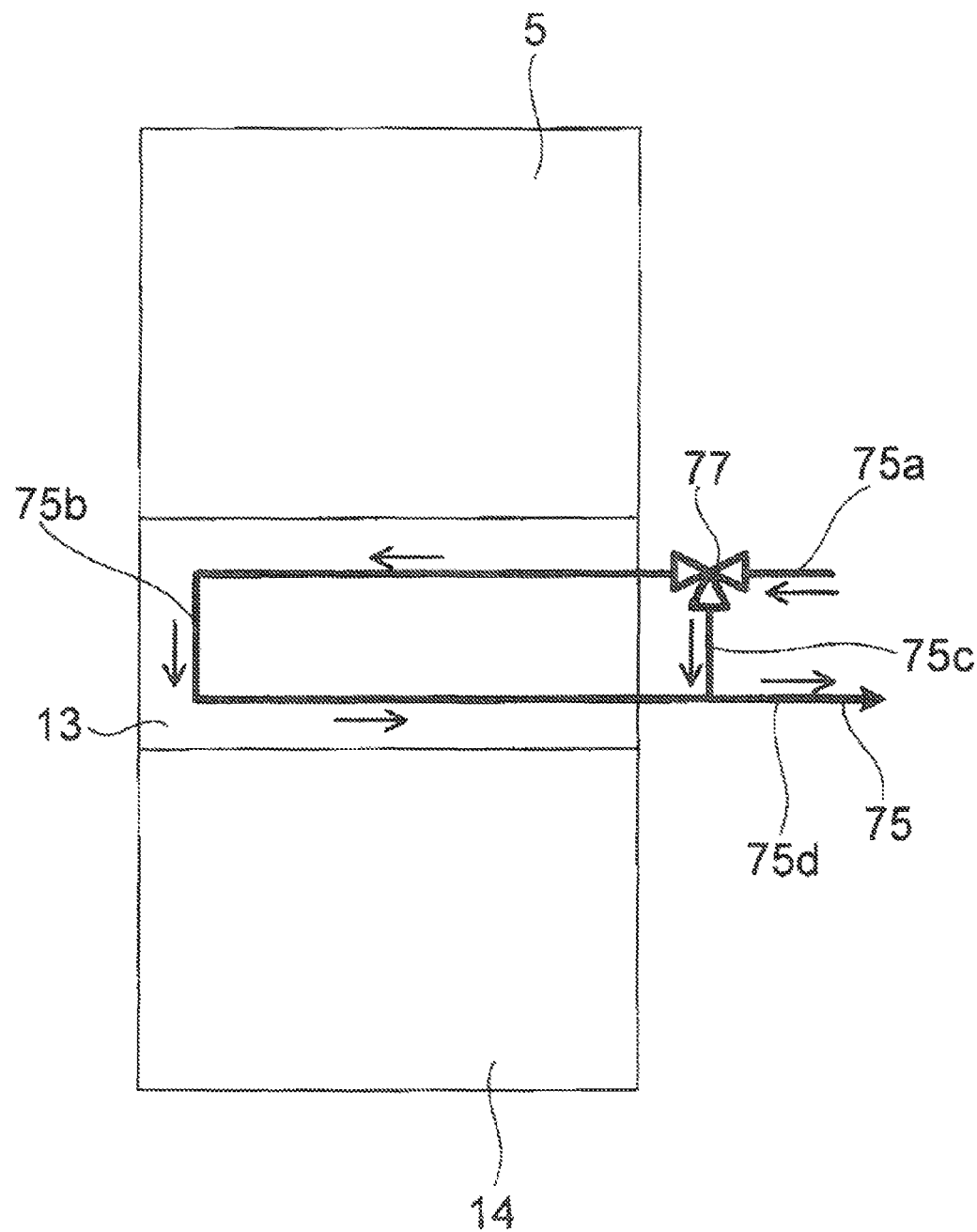
FIG. 6 is a view of a coolant water flow in a third variation of the first embodiment.

In the first embodiment, the two-way valve is used as the electromagnetic valve 77 serving as the coolant switcher, but a three-way valve may be used. FIG. 6 illustrates details. The cooling device 13 includes the coolant water path 75. The coolant water path 75 includes the three-way electromagnetic valve 77.

As illustrated in FIG. 6, since the electromagnetic valve 77 is provided, the coolant water path 75 is divided into four coolant water paths 75a to 75d. The coolant water path 75b is provided inside the cooling device 13, and is configured to cool the pump main body 5 and the power supply device 14 together. On the other hand, the coolant water paths 75a, 75c, 75d are provided outside the cooling device 13. Thus, the coolant water paths 75a, 75c, 75d do not cool the pump main body 5 and the power supply device 14.

Normally, the electromagnetic valve 77 sets coolant water to flow through the coolant water paths 75a, 75b, 75d.

However, when dew condensation still remains even after a lapse of the predetermined time at step S13A of FIG. 5, the CPU 14p controls, at step S13B, the three-way electromagnetic valve 77 such that coolant water flows through the coolant water path 75c instead of flowing through the coolant water path 75b. Thus, the coolant water flows through the coolant water paths 75a, 75c, 75d.

Since the three-way electromagnetic valve 77 is provided as described above, only coolant water flowing toward the turbo-molecular pump device 10 illustrated in FIG. 6 can be blocked. In the case where the coolant water path 75 is also disposed at a device (referred to as a "device A," and not shown in the figure) other than the turbo-molecular pump device 10, coolant water flowing toward the device A is not blocked, and therefore, the device A can be constantly cooled in any state of the electromagnetic valve 77.

Second Embodiment

The present embodiment and the first embodiment are different from each other only in dew condensation elimination control implemented as part of the power running control of step S2 shown in FIG. 4. The configuration of the present embodiment similar to that of the first embodiment will not be described.

Figure 7:
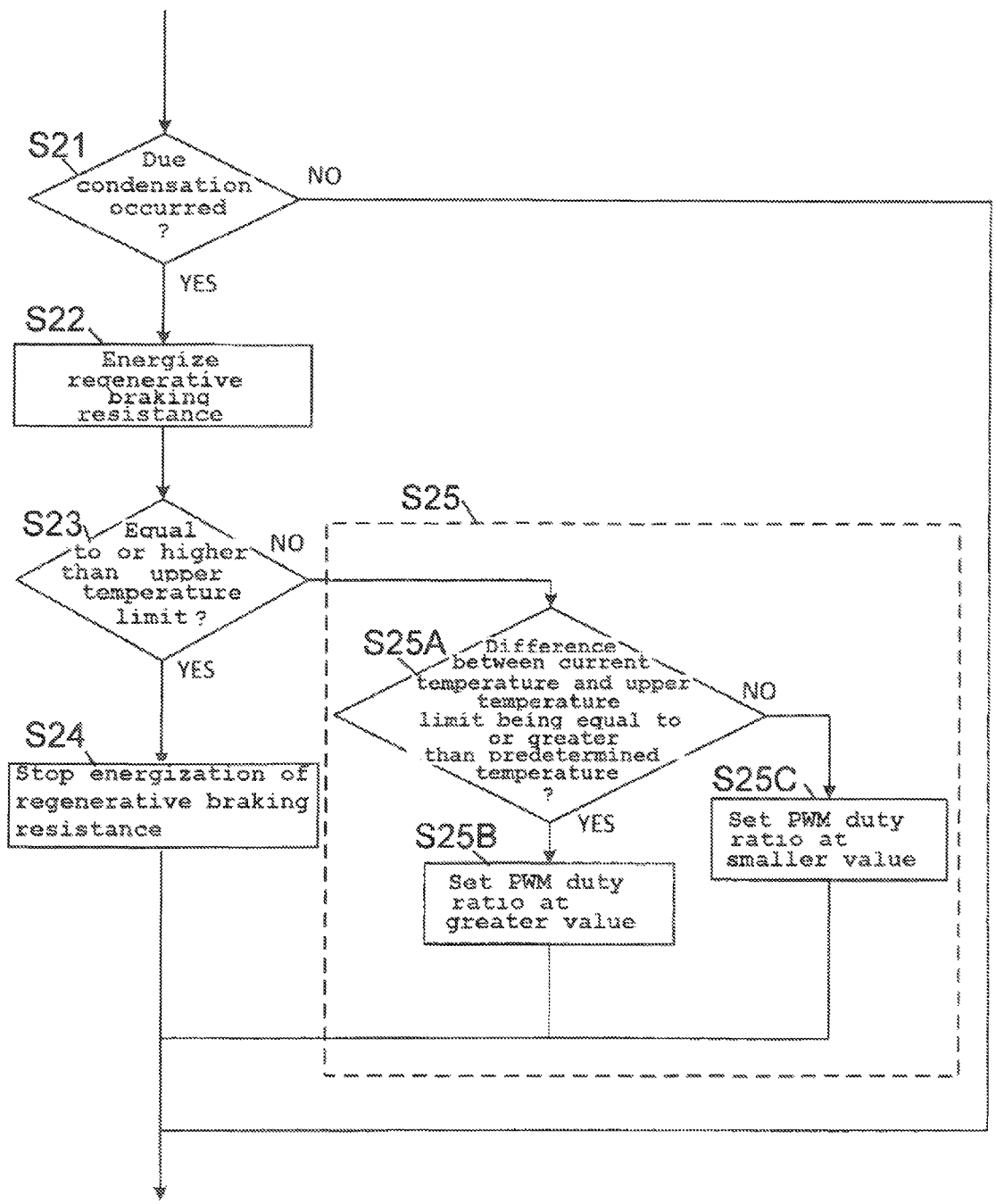
FIG. 7 is a flowchart of dew condensation elimination control in a second embodiment.

FIG. 7 is a flowchart of the dew condensation elimination control of the present embodiment. At step S21, when a dew condensation detector 14r detects dew condensation, it is determined as "yes," and the process proceeds to step S22. When no dew condensation is detected, it is determined as "no," and the process shown in FIG. 7 is completed.

At step S22, a transistor control circuit 14i of a first controller 14m having received a command from a CPU 14p turns on a transistor 14j. Thus, a regenerative braking resistance 14h is energized. Subsequently, the process proceeds to step S23. Note that the CPU 14p functions to distribute the output of the first controller such that no change occurs in energization of a motor 16 and a magnetic bearing 17 due to the above-described energization.

At step S23, when the inner temperature of a power supply device 14 measured by a temperature detector 14s is equal to or higher than a preset upper temperature limit (e.g., 50° C.), it is determined as "yes," and the process proceeds to step S24. When the inner temperature of the power supply device 14 is lower than the upper temperature limit, it is determined as "no," and the process proceeds to step S25.

At step S24, the transistor control circuit 14i having received a command from the CPU 14p turns off the transistor 14j. Thus, energization of the regenerative braking resistance 14h is stopped. Subsequently, the process shown in FIG. 7 is completed. Note that the process of determining as "yes" at step S23 and stopping energization of the regenerative braking resistance 14h at step S24 is performed because dew condensation can be eliminated without heating by the regenerative braking resistance 14h if the inside of the power supply device 14 is under relatively-high temperature. Moreover, such a process is performed because an excessive increase in the inner temperature of the power supply device 14 is prevented if coolant water is blocked due to an external factor or the temperature of coolant water is high.

At step S25A, when a difference between the inner temperature of the power supply device 14 measured by the temperature detector 14s and the above-described upper temperature limit is equal to or greater than a predetermined temperature difference, it is determined as "yes," and the process proceeds to step S25B. When such a difference is less than the predetermined temperature difference, it is determined as "no," and the process proceeds to step S25C.

At steps S25B and S25C, the transistor control circuit 14i having received a command from the CPU 14p performs PWM control for the transistor 14j.

At step S25B, control for increasing a PWM duty ratio by the transistor control circuit 14i, i.e., control for setting the PWM duty ratio at a greater value by the transistor control circuit 14i, is performed for the transistor 14j, and therefore, a current flowing through the regenerative braking resistance 14h is set at a greater value. As a result, current flowing through the regenerative braking resistance 14h increases. Subsequently, the process shown in FIG. 7 is completed.

At step S25C, control for decreasing the PWM duty ratio by the transistor control circuit 14i, i.e., control for setting the PWM duty ratio at a smaller value by the transistor control circuit 14i, is performed for the transistor 14j, and therefore, the current flowing through the regenerative braking resistance 14h is set at a smaller value. As a result, current flowing through the regenerative braking resistance 14h decreases. Subsequently, the process shown in FIG. 7 is completed.

The following features and advantageous effects are exhibited according to the second embodiment described above.

(1) When the inner temperature of the power supply device 14 measured by the temperature detector 14s is equal to or higher than the preset upper temperature limit (e.g., 50° C.), the transistor control circuit 14i having received the command from the CPU 14p turns off the transistor 14j. Thus, energization of the regenerative braking resistance 14h is stopped.

With this configuration, an excessive increase in the inner temperature of the power supply device 14 can be prevented. Moreover, at a temperature around the upper temperature limit, dew condensation tends to be eliminated without heating by the regenerative braking resistance 14h. This will not be a problem.

(2) The transistor control circuit 14i having received the command from the CPU 14p performs the PWM control for the transistor 14j. When the inner temperature of the power supply device 14 measured by the temperature detector 14s is lower than the preset upper temperature limit (e.g., 50° C.), if the difference between the inner temperature of the power supply device 14 and the upper temperature limit is equal to or greater than the predetermined temperature difference, the PWM duty ratio is set at a greater value, and the current applied to the regenerative braking resistance 14h is set at a greater value. Moreover, if the difference between the inner temperature of the power supply device 14 and the upper temperature limit is less than the predetermined temperature difference, the PWM duty ratio is set at a smaller value, and the current applied to the regenerative braking resistance 14h is set at a smaller value.

With this configuration, heating can be properly performed using the regenerative braking resistance 14h. Thus, while excessive heating of the power supply device can be avoided, an energy saving effect can be expected.

Variation of Second Embodiment

In the second embodiment, control is made to perform step S25 shown in FIG. 7 is made. However, control may be made to skip step S25. In this case, when it is determined as "no" at step S23, the process shown in FIG. 7 is completed without performing step S25.

Third Embodiment

The present embodiment and the first embodiment are different from each other only in dew condensation elimination control implemented as part of the power running control of step S2 shown in FIG. 4. The configuration of the present embodiment similar to that of the first embodiment will not be described.

In the first embodiment, the CPU 14p functions to distribute the output of the first controller such that no change occurs in energization of the motor 16 and the magnetic bearing 17 due to energization of the regenerative braking resistance 14h. However, when power required for the motor 16 and the magnetic bearing 17 is close to the total output of the primary power source 15, energization of the regenerative braking resistance 14h needs to be stopped.

Figure 8:
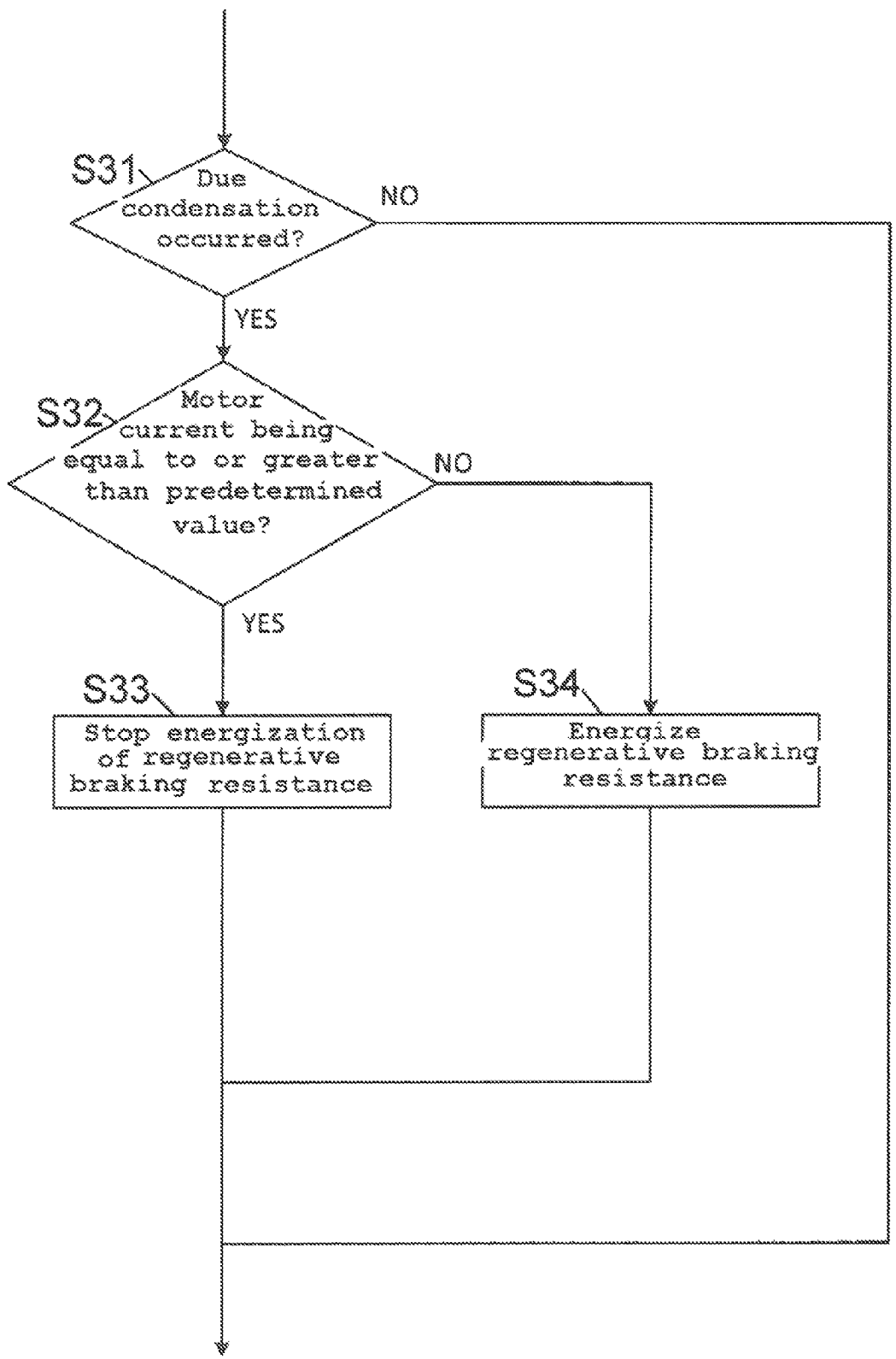
FIG. 8 is a flowchart of dew condensation elimination control in a third embodiment.

FIG. 8 is a flowchart of dew condensation elimination control of the present embodiment. At step S31, when a dew condensation detector 14r detects dew condensation, it is determined as "yes," and the process proceeds to step S32. When no condensation is detected, it is determined as "no," and the process shown in FIG. 8 is completed.

At step S32, when a current flowing through a motor 16 and measured by a current detector 14n is equal to or greater than a predetermined current value set in advance, it is determined as "yes," and the process proceeds to step S33. When such a current is less than the predetermined current value, it is determined as "no," and the process proceeds to step S34. Note that the predetermined current value is set based on a motor current calculated by subtracting the maximum power consumption of a magnetic bearing 17 and the maximum power consumption of a regenerative braking resistance 14h from a total power supplied from a primary power source 15.

At step S33, a transistor control circuit 14i having received a command from a CPU 14p turns off a transistor 14j. Thus, energization of the regenerative braking resistance 14h is stopped. Subsequently, the process shown in FIG. 8 is completed.

At step S34, the transistor control circuit 14i having received a command from the CPU 14p turns on the transistor 14j. Thus, the regenerative braking resistance 14h is energized. Subsequently, the process shown in FIG. 8 is completed.

The following feature and advantageous effects are exhibited according to the third embodiment described above.

When the current flowing through the motor 16 and measured by the current detector 14n is equal to or greater than the predetermined current value set in advance, the transistor control circuit 14i having received the command from the CPU 14p turns off the transistor 14j to stop energization of the regenerative braking resistance 14h. When the current flowing through the motor 16 is less than the predetermined current value set in advance, the transistor control circuit 14i having received the command from the CPU 14p turns on the transistor 14j to energize the regenerative braking resistance 14h.

With this configuration, blocking of driving of the motor 16 can be avoided. Moreover, when the motor current is equal to or greater than the predetermined current value, heat generation of, e.g., a three-phase inverter 14c becomes greater. Thus, dew condensation tends to be eliminated without energization of the regenerative braking resistance 14h. This will not be a problem.

Fourth Embodiment

The present embodiment and the first embodiment are different from each other only in dew condensation elimination control implemented as part of the power running control of step S2 shown in FIG. 4. The configuration of the present embodiment similar to that of the first embodiment will not be described.

In the first embodiment, the CPU 14p functions to distribute the output of the first controller such that no change occurs in energization of the motor 16 and the magnetic bearing 17 due to energization of the regenerative braking resistance 14h. However, even when power required for the motor 16 and the magnetic bearing 17 is close to the total output of the primary power source 15, if power is not tight as in the third embodiment, energization of the regenerative braking resistance 14h is not stopped, but a current value is limited as described in the present embodiment.

Figure 9:
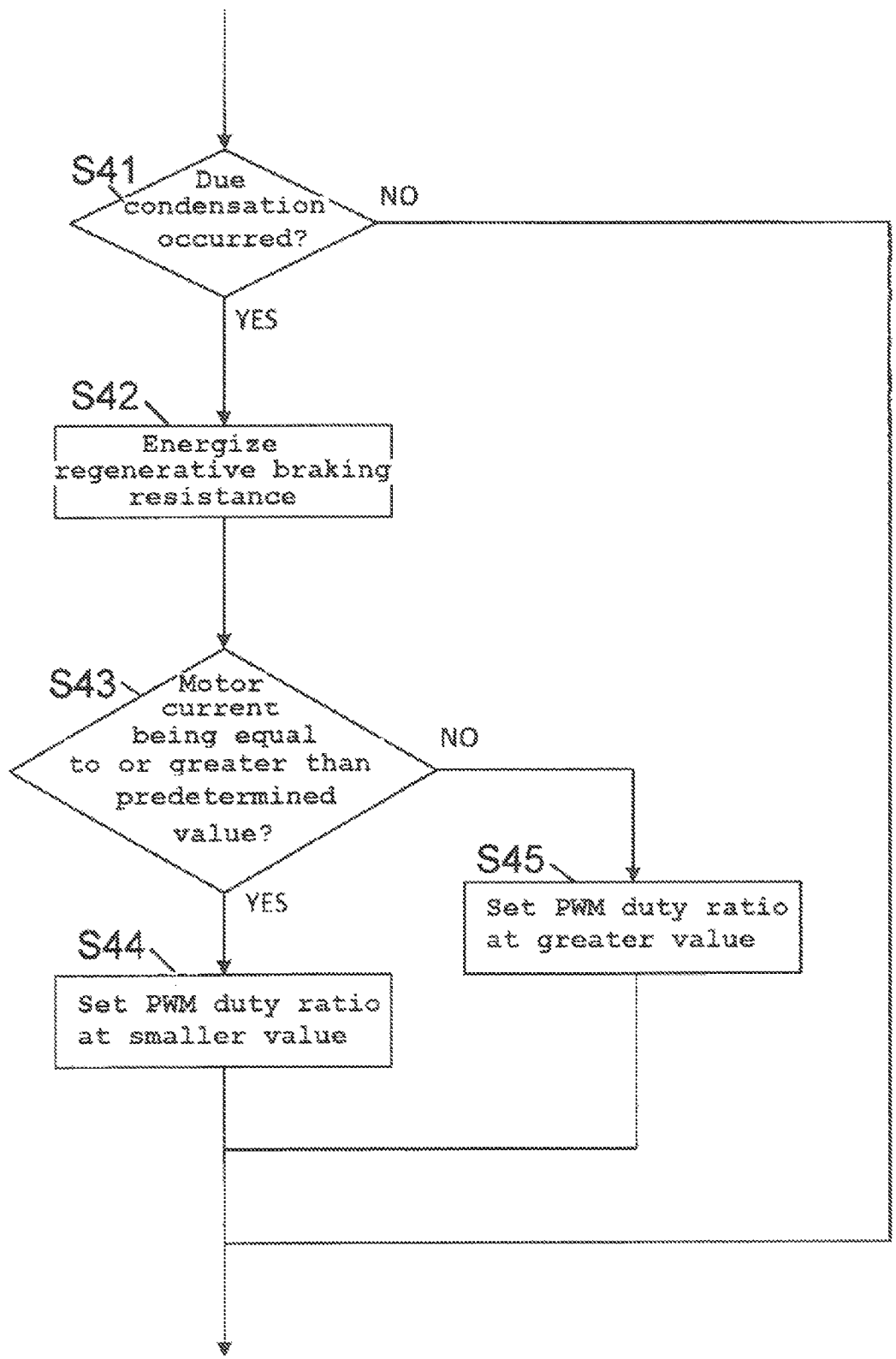
FIG. 9 is a flowchart of dew condensation elimination control in a fourth embodiment.

FIG. 9 is a flowchart of dew condensation elimination control of the present embodiment. At step S41, when a dew condensation detector 14r detects dew condensation, it is determined as "yes," and the process proceeds to step S42. When no dew condensation is detected, it is determined as "no," and the process shown in FIG. 9 is completed.

At step S42, a transistor control circuit 14i having received a command from a CPU 14p turns on a transistor 14j. Thus, a regenerative braking resistance 14h is energized. Subsequently, the process proceeds to step S43.

At step S43, when a current flowing through a motor 16 and measured by a current detector 14n is equal to or greater than a predetermined current value set in advance, it is determined as "yes," and the process proceeds to step S44. When such a current is less than the predetermined current value, it is determined as "no," and the process proceeds to step S45. Note that the predetermined current value is set smaller than the predetermined current value of step S32 shown in FIG. 8.

At steps S44 and S45, the transistor control circuit 14i having received a command from the CPU 14p performs PWM control for the transistor 14j.

At step S44, control for decreasing a PWM duty ratio by the transistor control circuit 14i, i.e., control for setting the PWM duty ratio at a smaller value by the transistor control circuit 14i, is performed for the transistor 14j, and therefore, a current flowing through the regenerative braking resistance 14h is set at a smaller value. As a result, current flowing through the regenerative braking resistance 14h decreases. Subsequently, the process shown in FIG. 9 is completed.

At step S45, control for increasing the PWM duty ratio by the transistor control circuit 14i, i.e., control for setting the PWM duty ratio at a greater value by the transistor control circuit 14i, is performed for the transistor 14j, and therefore, the current flowing through the regenerative braking resistance 14h is set at a greater value. As a result, current flowing through the regenerative braking resistance 14h increases. Subsequently, the process shown in FIG. 9 is completed.

The following features and advantageous effects are exhibited according to the fourth embodiment described above.

The transistor control circuit 14i having received the command from the CPU 14p performs the PWM control for the transistor 14j. When the current flowing through the motor 16 and measured by the current detector 14n is equal to or greater than the predetermined current value set in advance, the transistor control circuit 14i performs, for the transistor 14j, the control for setting the PWM duty ratio at a smaller value to set the current flowing through the regenerative braking resistance 14h at a smaller value. Moreover, when the above-described current is less than the predetermined current value, the transistor control circuit 14i performs, for the transistor 14j, the control for setting the PWM duty ratio at a greater value to set the current flowing through the regenerative braking resistance 14h at a greater value.

When motor current is high, the inner temperature of a power supply device 14 is high. Thus, even if the current applied to the regenerative braking resistance 14h is set at a smaller value, dew condensation can be eliminated. Moreover, while an excessive increase in the inner temperature of the power supply device 14 can be prevented, an energy saving effect can be expected. Moreover, the above-described predetermined current value does not block driving of the motor 16, and therefore, blocking of driving of the motor 16 can be avoided even in energization of the regenerative braking resistance 14h.

Fifth Embodiment

Figure 10:
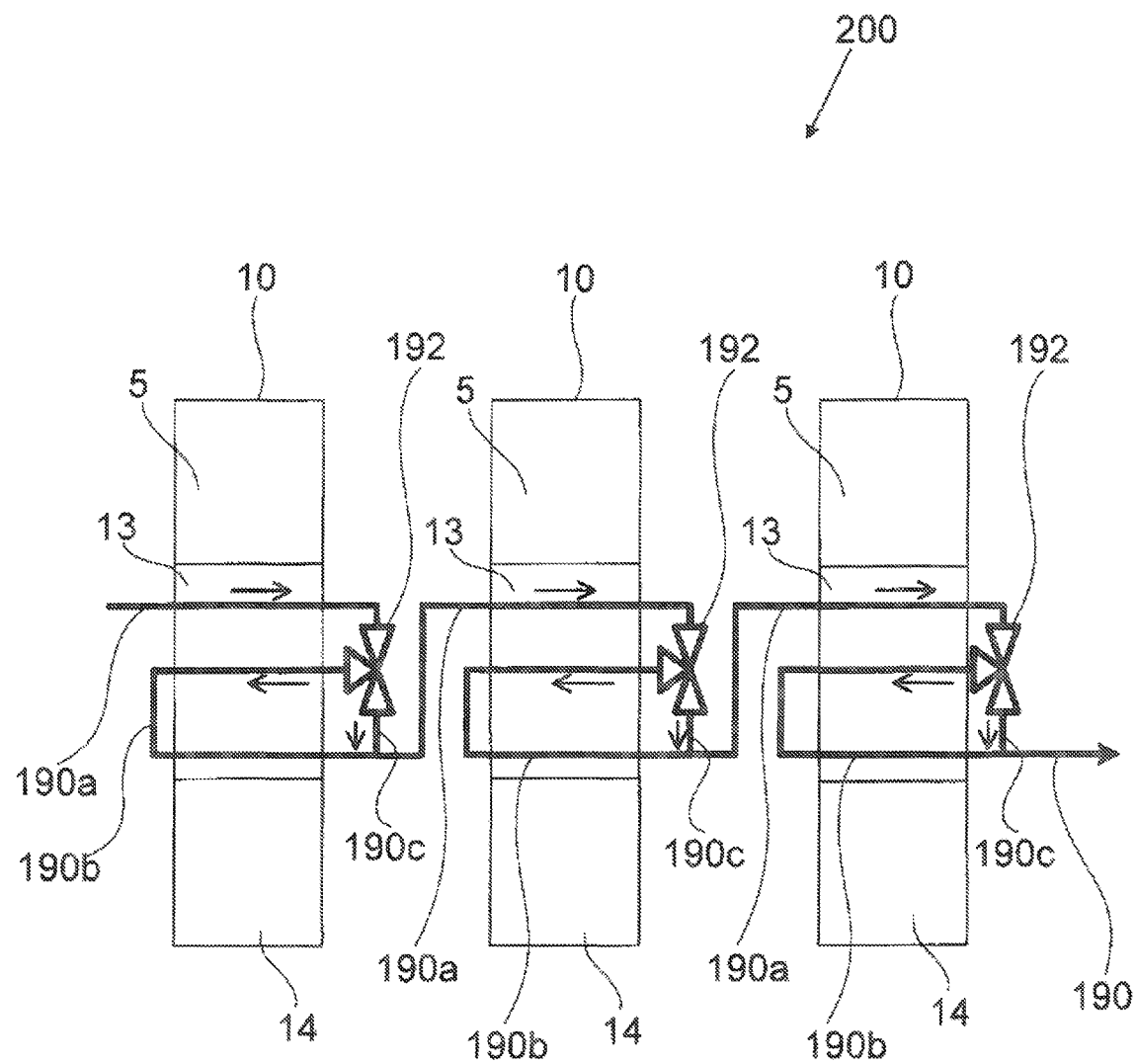
FIG. 10 is a view of the configuration of a turbo-molecular pump device system 200 of a fifth embodiment.

FIG. 10 is a view of a turbo-molecular pump device system 200 including, as a cooling system, a coolant water path 190 configured to cause coolant water to flow in series in a plurality of turbo-molecular pump devices 10. Note that FIG. 10 illustrates three turbo-molecular pump devices 10 as the turbo-molecular pump devices 10 of the turbo-molecular pump device system 200. However, such a configuration is merely an example. Note that the configuration of the present embodiment similar to that of the first embodiment will not be described.

As illustrated in FIG. 10, the coolant water path 190 is disposed in a cooling device 13 of each turbo-molecular pump device 10. Moreover, as illustrated in FIG. 10, a three-way electromagnetic valve 192 is provided corresponding to each turbo-molecular pump device 10 at the coolant water path 190. Specifically, as viewed in the figure, the turbo-molecular pump device 10 on the left side corresponds to the electromagnetic valve 192 on the left side, the turbo-molecular pump device 10 at the middle corresponds to the electromagnetic valve 192 at the middle, and the turbo-molecular pump device 10 on the right side corresponds to the electromagnetic valve 192 on the right side. The coolant water path 190 is divided into coolant water paths 190a to 190c by the electromagnetic valves 192. The coolant water path 190b is disposed in the vicinity of a power supply device 14 to cool the power supply device 14. On the other hand, the coolant water path 190c is disposed apart from the power supply device 14 not to cool the power supply device 14. A CPU 14p switches, using a corresponding one of the electromagnetic valves 192, a coolant water flow between a flow to the coolant water path 190b and a flow to the coolant water path 190c. Note that the electromagnetic valves 192 are normally set such that coolant water flows through the coolant water path 190b.

The power supply device 14 of each turbo-molecular pump device 10 of the present embodiment is, in addition to the configuration illustrated in FIG. 2, provided with a heater H (not shown) as a heat generator. That is, the heater H is different from a regenerative braking resistance 14h. The CPU 14p energizes the heater H to heat the inside of the power supply device 14.

In the present embodiment, control corresponding to steps S11 to S13 of FIG. 5 is made to eliminate dew condensation. When a dew condensation detector 14r provided at the power supply device 14 of any of the turbo-molecular pump devices 10 detects dew condensation (step S11), a transistor control circuit 14i provided at the power supply device 14 for which dew condensation has been detected and having received a command from the CPU 14p turns on a transistor 14j. Thus, the regenerative braking resistance 14h is energized (step S12). As a result, the regenerative braking resistance 14h generates heat to heat the inside of the power supply device 14 for which dew condensation has been detected.

When the dew condensation detector 14r still detects dew condensation after a lapse of a predetermined time (step S13A), the CPU 14p provided at the power supply device 14 for which dew condensation has been detected controls a corresponding one of the electromagnetic valves 192 to switch a coolant water flow to a flow to the coolant water path 190c (corresponding to step S13B).

In the cooling system as in the present embodiment, the turbo-molecular pump device 10 on the more upstream side of the coolant water path 190 is more cooled. Thus, more dew condensation occurs at the turbo-molecular pump device 10 on the more upstream side of the coolant water path 190. For this reason, only heating by the regenerative braking resistance 14h might not be considered as sufficient. In this case, the heater H is also energized so that heating by the regenerative braking resistance 14h can be assisted.

The following features and advantageous effects are exhibited according to the fifth embodiment as described above, and dew condensation in the power supply device 14 can be eliminated.

(1) The transistor control circuit 14i having received the command from the CPU 14p provided at the power supply device 14 for which dew condensation has been detected turns on the transistor 14j to energize the regenerative braking resistance 14h.

With this configuration, the inside of the power supply device 14 can be heated.

(2) When dew condensation is not still eliminated after a lapse of the predetermined time, the CPU 14p controls a corresponding one of the electromagnetic valves 192 to switch from the coolant water path 190b to the coolant water path 190c.

With this configuration, cooling of the power supply device 14 can be prevented.

(3) Further, when dew condensation is not still eliminated, the CPU 14p energizes the heater H. This can further heat the inside of the power supply device 14.

Variation of Fifth Embodiment

In a variation of the present embodiment, control including only steps S11 and S12 shown in FIG. 5 or control shown in FIGS. 7 to 9 can be performed instead of control of steps S11 to S13 shown in FIG. 5 to eliminate dew condensation.

In the above-described embodiments and variations, water is used as refrigerant (coolant). However, other types of refrigerant may be used.

In the above-described embodiments and variations, the case where the present invention is applied to the vacuum pump device configured such that the pump main body and the power supply device are integrated together has been described. However, as long as a cooling system using refrigerant is disposed near a power supply device, the present invention is applicable to a vacuum pump device configured such that a pump main body and a power supply device are separated from each other. Note that in the fifth embodiment, as long as a cooling system configured to cause coolant water to flow in series in a plurality of power supply devices is provided, a vacuum pump device configured such that a pump main body and a power supply device are integrated together and a vacuum pump device configured such that a pump main body and a power supply device are separated from each other may be combined.

In the above-described embodiments and variations, the sheath heater is used as the regenerative braking resistance 14h. However, a cartridge heater etc. may be used other than the sheath heater.

In the second and fourth embodiments, the transistor control circuit 14i performs the PWM control for the transistor 14j. However, the value of current flowing through the regenerative braking resistance 14h can be controlled by control other than the PWM control, such as PFM control.

Each embodiment described above may be combined with one or more of the variations. The variations may be combined together.

The description made above has been set forth merely as an example, and the present invention is not limited by the above-described embodiments.

What is claimed is:

1. A vacuum pump device comprising:
    a power supply device including
        a dew condensation detector configured to detect dew condensation,
        a regenerative braking resistance to which regenerative power from a motor and power from an AC/DC converter are input, and
        a controller configured to energize the regenerative braking resistance;
    a cooling system for cooling the power supply device using coolant; and
    a pump main body including the motor rotatably driven by the power supply device,
    wherein when the dew condensation detector detects the dew condensation, the controller energizes the regenerative braking resistance by supplying the power from the AC/DC converter to the regenerative braking resistance so as to heat an inside of the power supply device.

2. The vacuum pump device according to claim 1, further comprising:
    a coolant switcher configured to switch between a state in which a flow of the coolant for cooling the power supply device is blocked and a state in which the flow of the coolant for cooling the power supply device is allowed,
    wherein when the dew condensation detector detects the dew condensation, the controller causes the coolant switcher to block the coolant.

3. The vacuum pump device according to claim 2, wherein
    the power supply device further includes a timer configured to measure a time for which the dew condensation remains, and
    When the dew condensation is detected, the controller energizes the regenerative braking resistance, and then, when the dew condensation remains for a predetermined time, the controller causes the coolant switcher to block the coolant.

4. The vacuum pump device according to claim 1, wherein
    the power supply device further includes a temperature detector configured to monitor an inner temperature of the power supply device,
    the temperature detector monitors the inner temperature of the power supply device when the controller energizes the regenerative braking resistance, and
    when the inner temperature of the power supply device is equal to or higher than a predetermined upper temperature limit, the controller stops energization of the regenerative braking resistance.

5. The vacuum pump device according to claim 4, wherein
    when a difference between the predetermined upper temperature limit and the inner temperature of the power supply device is equal to or greater than a predetermined value, the controller sets a current applied to the regenerative braking resistance at a greater value, and
    when the difference is less than the predetermined value, the controller sets the current applied to the regenerative braking resistance at a smaller value.

6. The vacuum pump device according to claim 5, wherein
    the controller energizes the regenerative braking resistance by PWM control,
    when the difference between the predetermined upper temperature limit and the inner temperature of the power supply device is equal to or greater than the predetermined value, the controller sets a PWM duty ratio at a greater value to set the current applied to the regenerative braking resistance at a greater value, and
    when the difference is less than the predetermined value, the controller sets the PWM duty ratio at a smaller value to set the current applied to the regenerative braking resistance at a smaller value.

7. The vacuum pump device according to claim 1, wherein
    the power supply device further includes a current detector configured to detect a current applied to the motor, and
    when the current is equal to or greater than a predetermined current value, the controller does not energize the regenerative braking resistance.

8. The vacuum pump device according to claim 1, wherein
    the power supply device further includes a current detector configured to detect a current applied to the motor,
    when the current is equal to or greater than a predetermined current value, the controller sets a current applied to the regenerative braking resistance at a smaller value, and
    when the current is less than the predetermined current value, the controller sets the current applied to the regenerative braking resistance at a greater value.

9. The vacuum pump device according to claim 8, wherein
    the controller energizes the regenerative braking resistance by PWM control,
    when the current is equal to or greater than the predetermined current value, the controller sets a PWM duty ratio at a smaller value to set the current applied to the regenerative braking resistance at a smaller value, and
    when the current is less than the predetermined current value, the controller sets the PWM duty ratio at a greater value to set the current applied to the regenerative braking resistance at a greater value.

* * * * *